July 6, 1948.                    D. D. GRIEG ET AL                    2,444,439
                                BEACON RECEIVER MEANS
Filed March 26, 1945                                              2 Sheets-Sheet 1

INVENTORS
DONALD D. GRIEG
ALEXANDER FRUM
LESTER DUBIN
BY
*Percy P. Lantz*
ATTORNEY

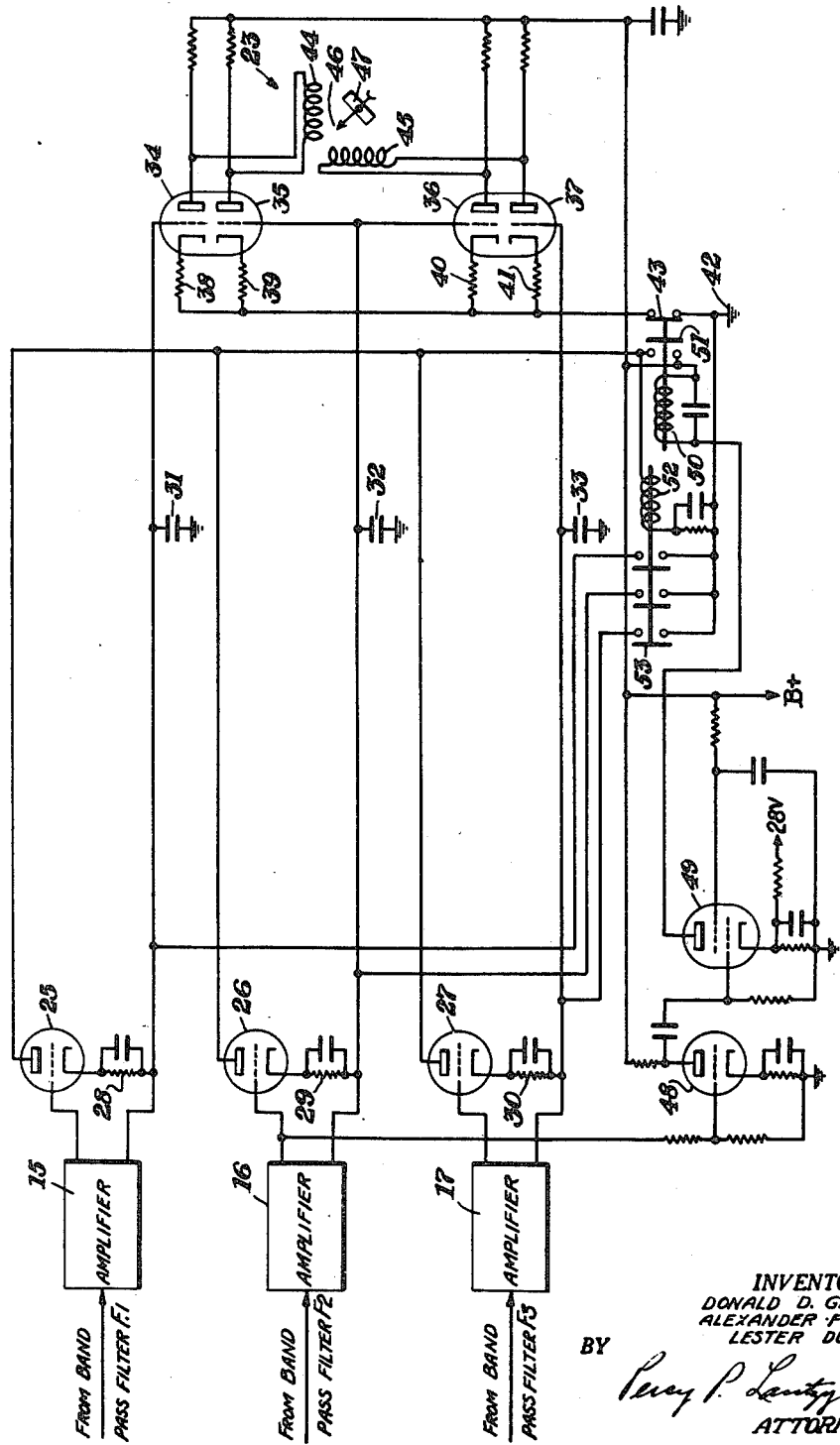

Patented July 6, 1948

2,444,439

UNITED STATES PATENT OFFICE 2,444,439

BEACON RECEIVER MEANS

Donald D. Grieg, Forest Hills, Alexander Frum, New York, and Lester Dubin, Brooklyn, N. Y., assignors to Federal Telephone and Radio Corporation, New York, N. Y., a corporation of Delaware Application March 26, 1945, Serial No. 584,862

19 Claims. (Cl. 177—352)

This invention relates to radio beacons and more particularly to receiver means for indicating its location relative to a beacon of the rotary signalling type.

In the copending application of E. Labin and D. D. Grieg 92–104, Ser. No. 581,974 filed: March 10, 1945, there has been described a visual indicator beacon system which is applicable to various modulation methods and wherein all positional information is presented by means of a direct viewing meter unit which may, for instance, be located on the dashboard of an aircraft for determining directional position with respect to a reference base.

In the beacon system of the above-identified copending application, the radio beam is modulated in synchronism with its rotation about the transmitter position, the modulation being such that continuous indications may be had from the indicator at the receiver station in contrast to indications by azimuth segments as in some previous systems. In order that the bearings obtained with such a system remain independent of supply voltage changes, input and output signal changes, and so forth, the transmitter and receiver signals are in the form of ratios rather than absolute signal values. The meter indicator at the point of observation is a special ratiometer device which is not affected by variations in the absolute levels of these signals. By this means the accuracy of the system may be maintained independent of the operating parameters.

It is an object of this invention to provide for an omni-directional radio beacon system of the above described type, apparatus suitable for operating an indicator for signal ratios.

It is a further object to provide controls for a signal ratio indicating device which will serve to render the indications thereof dependent on the beginning and the duration of the signal or beam encountered by the receiver.

It is still another object to provide means for a signal ratio indicating device which will maintain the last indication until a revised bearing at the next beam interception is obtained.

In accordance with a feature of this invention, we provide a receiver with a special indication unit for use in a radio beacon system having a transmitter emitting three signals over a rotating directional antenna wherein two of the signals are modulated in amplitude in synchronism with the rotation of the antenna and the third is of constant amplitude. As the beam passes the receiver antenna, an interpretation of the signals in terms of position with respect to the transmitter location is directly given. The indicating device used with the receiver is a ratiometer, consisting of two coils placed at an angularity of 90 degrees with respect to one another. In order that the ratiometer needle may be made to move through 360 degrees, it is necessary that one of the ratiometer coils be supplied with a voltage which is proportional to sine $\theta$, and the other coil is supplied with a voltage proportional to cosine $\theta$. For any particular value of $\theta$, then the needle will align itself with the resultant magnetic field which will lie at an angle, $\theta$, with a fixed reference direction. Since the circuit feeding the ratiometer consists essentially of a detector which can furnish signals of only one polarity it becomes necessary to transmit three signals which are proportional to $(A+\text{Sine } \theta)$, $(A+\text{Cosine } \theta)$ and A, respectively, where $\theta$ is the angle that the transmitter antenna makes with a fixed reference direction and A has a value equal to or greater than unity. In the ratiometer circuit the value A is subtracted from each of the other two values yielding the desired sine and cosine functions.

As the signal from the transmitter passes the antenna of the plane, the field strength increases until such time as the transmitter antenna is pointed directly at the plane and then decreases this field strength variation being symmetrical about the maximum value. The width of this beam is of course, dependent on the distance of the plane from the transmitter, which may be located either on land or on a ship. During the time the signal is being received, the transmitter antenna is changing its position and therefore the information received is varying with the angle of the antenna. Special circuits are provided to integrate the signal over the width of the beam so that the final signal is made proportional to the center thereof and to rotate the meter pointer to the correct bearing indication. This electrical information is maintained on the meter until the next bearing is received.

These and other objects and features of the invention may be better understood from the detailed description made with reference to the accompanying drawings, in which:

Fig. 3 is a diagram showing partly in schematic form the receiver circuit portion of Fig. 2 incorporating our invention.

Figure 1:
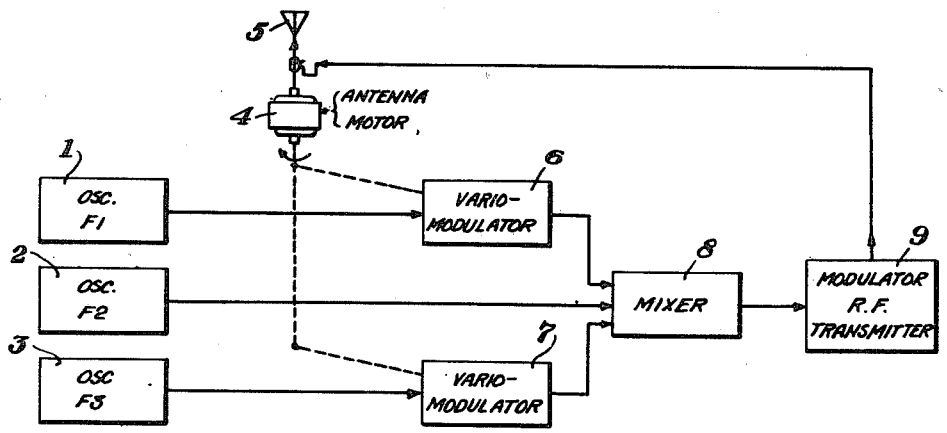
Fig. 1 is a diagram in block form of a beacon transmitter for use with our invention.

Referring now to Fig. 1, there is shown a transmitter circuit comprised of three separate oscillators 1, 2 and 3 which are designed to produce oscillations having the frequencies $F_1$, $F_2$ and $F_3$, respectively.

Of these, the signals from oscillators 1 and 3 are subjected to a continuous modulation which is synchronized with the antenna rotation by a motor 4 which drives both the antenna 5 and the vario-coupler modulator circuits 6 and 7. The signal of the second oscillator, which remains at a constant and unmodulated value is then combined with the two modulated signals in a mixer circuit 8, the composite signal modulating the final transmitted signal in the modulator and radio frequency transmitter 9.

Figure 2:
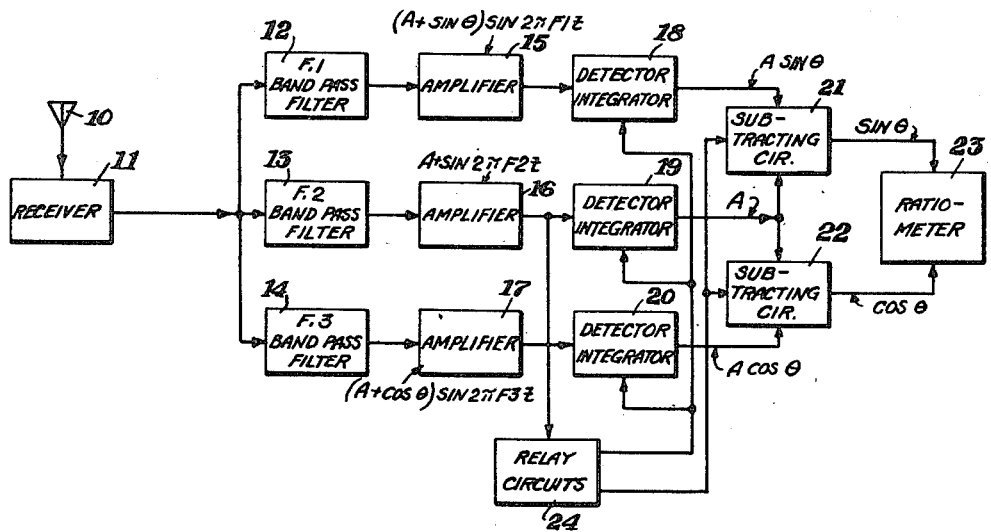
Fig. 2 is a diagram in block form of a receiver circuit incorporating our invention.

In the block diagram of Fig. 2, is shown a receiving antenna 10 which is applied to a receiver 11. The composite signal as picked-up by the antenna 10 is broken down into components by means of band pass filters 12, 13 and 14 in accordance with their respective frequencies $F_1$, $F_2$ and $F_3$. The three signals, are now amplified in the amplifiers 15, 16 and 17 and subsequently applied to the detector integrator circuits 18, 19 and 20. After obtaining the detected signals, of which the two originally modulated signals still retain their modulating uni-directional envelope and the unmodulated signal is subtracted from each in the subtracting circuits 21 and 22 to result in two modulated currents which are fed into the coils of a ratiometer 23. Relay circuits 24 which are energized by means of the amplified unmodulated signal, control the operation of the detector-integrator circuits and of the subtracting circuits explained hereinafter in detail in connection with Fig. 3.

Referring now to Fig. 3, it may be seen that the circuits for the three signals which are generally identical comprise after each of the amplifiers 15, 16 and 17 integrator-detector circuits which consist of electron charging tubes 25, 26 and 27, to the grids of which the respective signals are applied for the control of the plate currents thereof. The respective tubes are suitably biased by means of cathode resistors 28, 29 and 30 to give them a large impedance and provide them with detector or rectifying characteristics. The tubes are connected to ground through integrating condensers 31, 32, 33, respectively. The voltages to ground of the integrating condensers are applied to the grids of two pairs of triodes 34, 35 and 36, 37, the voltage due to the non-modulated signal being applied to the grids of two of the triodes, 35 and 36. The cathodes of the triodes 34, 35, 36, 37 are provided with cathode biasing resistors 38, 39, 40, 41 and connect to ground at 42 through a relay controlled contact 43. The anodes of each pair of the triodes are connected to the opposite terminals of one of the two field coils 44, 45 respectively which are disposed in a 90 degree angularity with respect to one another and provide the field governing the indication of the ratiometer 23 (see Fig. 2). An indicator 46 is suitably mounted on an armature coil or magnet 47, which receives its turning moment from the resultant magnetic field of the coils 44 and 45 and serves to indicate the desired direction in degrees from a given null position. The operability of the two pairs of triodes as well as that of the detector-integrators is made dependent upon the presence of a signal from the amplifier 16, which is given suitable amplification in the triode 48 and the tetrode 49 to provide an energizing current for a master relay 50 which operates a double action contact 51 and 43. Contact 51 controls the energization of a slave relay 52 which in turn operates a triple contact 53 serving to by-pass to ground the integrating condensers 31, 32, and 33.

The operation of the system as a whole is described in the copending application, Labin-Grieg 92–104 Ser. No. 581,974, above referred to, and therefore will be recapitulated here only briefly. The vario-modulators (Fig. 1), may comprise two stationary coils with a relative 90 degree angularity and a rotary coil. The rotary coil is rotated together with the antenna 5 so that its angle of displacement $\theta$ from a given null or reference point is also that of the rotated antenna. The three oscillators supply signal energy preferably at audio frequencies which substantially may be expressed as A sine $2\pi F_1 t$, A sine $2\pi F_2 t$, and A sine $2\pi F_3 t$. The stator coils induce a voltage in the rotary coil of the vario-modulator which varies synchronously in amplitude with the rotation of the rotary coil. Due to the physical arrangement of the two stator coils the amplitude variations of the two voltages induced in the rotary coil are 90 degrees out of phase that is one is a sine, the other a cosine function of the angle $\theta$. The constant amplitude current of the stator coils and the varying amplitude current of the rotary coil are combined so that an A+sine function of the one frequency and an A+cosine function of the other frequency is finally obtained; the final expression of the three signals as ultimately brought together in the mixer 8 is as follows:

(A+sine $\theta$) sine $2\pi F_1 t$
(A+cosine $\theta$) sine $2\pi F_3 t$
A sine $2\pi F_2 t$ where $A \geq 1$ The composite signal which is the sum of the three above-described functions is broken down again in the receiver Figs. 2 and 3, into its constituent components through the medium of the respective band pass filters 12, 13, and 14 as indicated in Fig. 2. After amplification and detection, a signal voltage is obtained for the first and third signals which consists of a sum of the second signal A and signals proportionate to the sine and cosine functions respectively, that is, they may be expressed as A+sin $\theta$ and A+cos $\theta$. This second signal A is then subtracted from both of these signal voltages in the subtracting circuits 21 and 22, the resulting signals becoming directly proportional to the pure sine and cosine functions of the angle $\theta$. The output of the two ratiometer coils 44, 45 causing the deflection of the indicator coil 47 is proportional to the quotient of these two functions, that is, it equals the function tan $\theta$.

Since the highly directive rotary signal beam from the transmitter has a relatively short duration at any one time with respect to the receiver, it is clear that if the signal voltages due to such a beam were applied directly to the ratiometer the rotary coil 47 would vary in position over the width of the beam starting with the leading edge thereof in the receiver when it first becomes sensitive and stopping when the beam passes the receiving antenna. Such an indication then, instead of giving a direct line to the beacon transmitter would rather indicate the edge of the beam. It would be difficult under these circumstances for the pilot or operator to read the midpoint of the pointer swing. It is therefore desirable to provide some means which will indicate sufficiently the mid-position of the beam. In the present system this beam center finder system comprises the detector integrator circuits 25–31 for the first signal, and the analogous circuits for the other two signals. Thus the A+sine and A+cosine envelope portions as well as the constant amplitude envelope portions are applied separately to the three integrating circuits comprised of the vacuum tubes 25, 26, 27 and the condensers 31, 32 and 33, respectively. The vacuum tubes in this case provide a substantial impedance for the integrating condensers which are in series with their cathode circuits to ground to improve their integrating characteristics. The energy is applied across each of the vacuum tubes and thus serves to charge each of the condensers, the plate current being a linear function of the grid voltage. This charging of the condensers occurs for the time during which the beam is received. The integrated voltage energy is then applied to the grids of the electron discharge tubes 34, 35, and 36, 37 in the subtracting circuits which serve to supply energy to the ratiometer coils 44 and 45. Since the width of the beam and hence the time of integration is a function of the distance between the transmitter and the receiver, the voltage to which the integrating condensers will charge may vary according to this distance. It is necessary therefore to limit the maximum voltage which is given by the dissipation characteristics of the output tubes when the beam may be expected to be at its widest. For normal operation the mid operating point is selected for a voltage which corresponds to the integrated constant amplitude signal with equal positive and negative values for the grid swing in respect to the selected mid-operating point.

The condensers also serve as a storage for the integrated signal between the times when the beam passes the receiving antenna, making a continued indication of the last bearing possible. While the charge of each of the three condensers will tend to leak off, the leakage from all three condensers will be substantially proportional so that the ratio of the energy supplied to the ratiometer coils will remain constant. However, it is necessary, to discharge the storage condensers every time that the beam is about to pass the antenna, in order that the new values of the condenser voltage may represent the ratio of the energies in the next beam and not a cumulative effect produced by a number of passages. The electron charging tubes which serve as the high impedance must also be de-energized whenever the beam energy is not being received so that their continued operation will not keep up the charging of the condensers to the point where grid current will be drawn by the following tubes 34, 35, 36 and 37.

To accomplish these purposes, the two relays 50 and 52 are provided. The master relay 50 is arranged to operate immediately the beam energy is received and a predetermined voltage level is exceeded and establishes a plate potential for the three impedance tubes 25, 26 and 27 over contact 51.

In the present system where three signal energy components are used, the reference frequency of the second signal serves the purpose of operating this relay, since it is not modulated in accordance with azimuth at the transmitter. At the same time that the master relay 50 closes the plate circuit for the impedance tubes it also closes the circuit 51 for energizing the slave relay 52.

The slave relay is operated by transients which are produced upon the closing of the master relay circuit. This relay pulse closes the contacts 53 to short-circuit to ground the three storage condensers 31, 32 and 33. As soon as the transient passes through the relay coil a time-constant circuit in the return thereof is charged so that the relay again drops to permit the condensers to charge up in accordance with the new beam signals. As the beam passes the receiving antenna the master relay 50 drops to cause de-energization of the impedance tubes so that the condensers will not be further charged and permitting them to retain their storage voltage until the next beam action crosses the antenna path. At the time when the relay 50 is energized, that is, during the presence of the signal and at the time that the integration takes place, the cathode circuits of the impedance tubes are disconnected by contact 43. Accordingly, no energy will be supplied to the ratiometer coils until a ratio corresponding to the integrated beam signal, that is, until the beam center has been attained. This results in a return movement of the indicator each time the beam passes, thereby giving an assurance of indicator operation.

Referring now to the mixer or subtracting circuits and the ratiometer, there is normally a direct current plate voltage applied to the coils 44 and 45, which are disposed at right angles to one another, and to the four output tubes 34, 35, 36 and 37. The tubes are biased in such a way that normally when the plate voltage is applied the tubes carry current. But since this plate voltage causes equal current flowing into the opposite ends of the two ends of the ratiometer coils, the coils are maintained at a zero resultant potential. The voltages due to the beam signal are applied to the grids of the outside tubes 34 and 37, the anodes of these tubes being connected to one end of coils 44 and 45 respectively. The grids of the tubes 35 and 36 are connected for the application thereto of the steady voltage of the middle or second signal circuit. The anodes of these inner tubes are connected to the other ends of the coils 44 and 45 respectively. Consequently, there will be produced across these coils a voltage equal to the differences between the signals made up of the constant voltage and of the sine function, and of the constant voltage, and of the cosine function and the steady voltage function respectively. As a result the voltage across these two coils will vary positively and negatively relative to their normal value so that a complete 360 degree turning effect may be obtained on the indicator coil 47.

Preferably, cathodes of the output tubes are biased by the provision of cathode resistors in order to assure considerable negative feedback and to maintain the tubes at such low amplification that they will not draw grid current thus tending to discharge the integrating condensers connected to the inputs, whenever the storage of the beam signal is desired as outlined above.

While we have shown our invention embodied in a specific form and in connection with specific signal characteristics, it is clear that other types of signals and appropriate circuits may be provided. It should therefore be understood that modifications and variations in this system in accordance with our invention may occur to those skilled in the art. The particular embodiment given above is presented merely by way of illustration and should not be considered as a limitation of our invention as set forth in the objects thereof and in the appended claims.

We claim:

1. In combination with a ratiometer device having two field coils placed at an angle with respect to one another for producing an operating magnetic field, means for supplying a first composite voltage made up of a first signal and of a second signal, means for supplying a second composite voltage made up of a third signal and of said second signal, means for supplying said second signal, circuit means for effecting a subtraction of said second signal from said first composite voltage and from said second composite voltage, and means for applying the two resulting differential signals of said last named means to the said two field coils, respectively.

2. In combination with a ratiometer device having two field coils placed at an angle of 90 degrees with respect to one another for producing an operating magnetic field, means for supplying a first composite voltage made up of a first signal modulated as the sine of the angle of departure from a base of a continuously rotating reference vector and of a constant amplitude second signal, means for supplying a second composite voltage made up of a third signal modulated as the cosine of the said angle and of said constant second signal, means for supplying said second constant signal, circuit means for subtracting said second signal from said first composite voltage and from said second composite voltage, and means for applying the resulting differential signals of said last named means to the said two field coils respectively.

3. A combination in accordance with claim 2, wherein said first, said second and said third signals comprise different base frequencies and the three first named means include demodulators for said three signals respectively.

4. A combination in accordance with claim 2, further including means for providing a signal voltage corresponding to the center of a beam signal having a given leading and a given trailing edge in respect to time including a voltage integrator circuit.

5. A combination in accordance with claim 2, wherein the three first named means include voltage integrator circuits, the combination further including operability control means for said integrator circuits controlled by the presence of a signal voltage.

6. A system for operating a ratiometer comprising means for supplying a first composite voltage made up of a first signal modulated as the sine of the angle of departure from a base of a continuously rotating reference vector and of a constant second signal, means for supplying a second composite voltage made up of a third signal modulated as the cosine of the said angle and of said constant second signal, means for supplying said second constant signal, means for integrating each of said composite voltages and said constant signal, means for controlling the operability of said integrator means responsive to the presence of a given signal, and means for operatively applying the output of the integrating means to said ratiometer.

7. A system according to claim 6, wherein said means for controlling is in operative connection with said means for supplying said constant signal.

8. A system in accordance with claim 6, wherein said means for controlling includes means for instantly clearing said means for integrating of any preceding signal upon the presence of said given signal.

9. A system for operating a ratiometer type indicator including two field coils placed at an angle of 90 degrees with respect to one another form producing an operating magnetic field for an indicator thereof, comprising means for supplying a first composite voltage made up of a first signal modulated as the sine of the angle of departure from a base of a continuously rotating reference vector and of a constant second signal, means for supplying a second composite voltage made up of a third signal modulated as the cosine of the said angle and of said constant second signal, means for supplying said second constant signal circuit means for subtracting said second signal from said first composite voltage and from said second composite voltage, means for controlling the operability of said circuit means responsive to the presence of a given signal, and means for applying the resulting differential signals of said circuit means to the said two field coils.

10. A system according to claim 9, wherein said circuit means comprises vacuum tubes having their cathodes normally connected to ground, and said means for controlling includes means for interrupting the circuit of said cathodes to ground.

11. A system in accordance with claim 9, wherein said circuit means comprises a pair of electron discharge tubes for each of said coils, the output current of each of the said pair of tubes being fed to the respective coil in opposition to one another, and the said pairs of tubes being controlled by said first composite voltage and said constant signal, and by said second composite voltage and said constant signal respectively.

12. A circuit for energizing a ratiometer device having two field coils from a source supplying three signals each having a different base frequency, two of said signals having differently modulated envelopes, and the third signal having a constant value, comprising a pair of electron discharge tubes for energizing each of the said coils, the plate current of the tubes of each pair being opposed to one another in the respective field coils and being a function of the constant signal and one of said modulated signals and of said constant signal and the other of said modulated signal respectively, and means for controlling the operability of said tubes responsive to the presence of a signal from said source.

13. A circuit according to claim 12 further including means for integrating the respective signals over a given period of time operatively disposed intermediate said source and said tubes.

14. A circuit according to claim 12 further including means for integrating the respective signals over a given period of time operatively disposed intermediate said source and said tubes, and means for operatively controlling said last named means responsive to the presence of a signal from said source.

15. A circuit for energizing a ratiometer device having two field coils from a source supplying three signals each of said signals having a different frequency and having an envelope corresponding respectively to a sine function and a constant value, a cosine function and a constant value and a constant value, comprising a pair of electron discharge tubes for energizing one of said coils, and a pair of electron discharge tubes for energizing the other of said coils, the plate current of the tubes of each pair being opposed to one another in the respective field coil, the plate current of one of said pair of tubes being a function of the constant value signal and said signal varying in correspondence with the sine function and a constant value, and the plate current of the other of said pair of tubes being a function of said constant value signal and said signal varying in correspondence with the cosine function and a constant value.

16. A circuit for energizing a ratiometer device having two field coils from a source supplying three signals, each of said signals having a different frequency, two of said signals having differently modulating envelopes, and a third signal having a constant value, comprising a pair of electron discharge tubes for energizing each of said coils, the plate current of the tubes of each pair being opposed to one another in the respective field coil and being a function of the constant signal and one of said modulated signals and one of said constant signal and said other modulated signal respectively, means for detecting each of the said signals, and means for integrating the respective signals over a given period of time forming a part of said last named means.

17. A circuit according to claim 16, wherein said means for integrating comprises a condenser for each signal between said detecting means and ground, further including means for discharging said condensers transiently responsive to the presence of a signal from said source.

18. A circuit for energizing a ratiometer device having two field coils from a source supplying three signals, each of said signals having a different frequency, two of said signals having differently modulating envelopes, and the third signal having a constant value, comprising a pair of electron discharge tubes for energizing each of said coils, the plate current of the tubes of each pair being opposed to one another in the respective field coil and being a function of the constant signal and one of said modulated signals and of said constant signal and said other modulated signal respectively, means for detecting each of said signals preceding said tubes, means for integrating the respective signal over a given period of time comprising a condenser for each signal and forming a part of said detecting means in its circuit to ground, means for controlling the operability of said tubes and of said detecting means comprising a double acting relay, and means for transiently discharging said condensers, said means for controlling and said means for discharging being responsive to the presence of a signal from said source.

19. A circuit for energizing a ratiometer device having two field coils from a source supplying three signals each having a different frequency, two of said signals having differently modulating envelopes, and the third signal having a constant value, comprising a pair of electron discharge tubes for energizing each of said coils, the plate current of the tubes of each pair being opposed to one another in the respective field coil and being a function of the cosntant signal and one of said modulated signals and of said constant signal and said other modulated signal respectively.

DONALD D. GRIEG.
ALEXANDER FRUM.
LESTER DUBIN.

REFERENCES CITED

The following references are of record in the file of this patent:

UNITED STATES PATENTS

| Number | Name | Date |
|---|---|---|
| 1,600,204 | Alexanderson | Sept. 14, 1926 |
| 1,941,615 | Mirick | Jan. 2, 1934 |
| 2,039,404 | Green | May 5, 1936 |
| 2,063,610 | Linsell | Dec. 8, 1936 |
| 2,213,874 | Wagstaffe | Sept. 3, 1940 |
| 2,274,546 | Hugenholtz | Feb. 24, 1942 |
| 2,400,552 | Hoover, Jr. | May 21, 1946 |

FOREIGN PATENTS

| Number | Country | Date |
|---|---|---|
| 230,013 | Great Britain | Mar. 2, 1926 |
| 406,592 | Great Britain | Mar. 1, 1934 |
| 469,417 | Great Britain | July 26, 1937 |